United States Patent [19]

Vettore et al.

[11] 3,855,627

[45] Dec. 17, 1974

[54] PROTECTIVE INTERLOCK CONTROLLING MOVEMENT OF HEAD AND PINCH ROLLER INTO OPERATIVE POSITION

[75] Inventors: Bruno Vettore, Cornaredo; Ferruccio Enrini, Milano; Tullio Percali, Settala, all of Italy

[73] Assignee: Honeywell Information Systems Italia, Milan, Italy

[22] Filed: June 14, 1973

[21] Appl. No.: 370,097

[30] Foreign Application Priority Data

June 23, 1972 Italy .............................. 26120/72

[52] U.S. Cl. .................... 360/105, 360/96, 360/109

[51] Int. Cl. ...... G11b 5/54, G11b 5/56, G11b 21/24

[58] Field of Search ........... 179/100.2 Z, 100.2 CA; 274/4 A, 4 E, 11 A; 360/105, 96, 109

[56] References Cited

UNITED STATES PATENTS

| | | | |
|---|---|---|---|
| 3,155,359 | 11/1964 | Hogan et al. | 179/100.2 CA |
| 3,609,844 | 10/1971 | Ichikawa | 179/100.2 Z |
| 3,635,423 | 1/1972 | Lennie | 274/4 E |
| 3,659,859 | 5/1972 | Marcinkus | 179/100.2 Z |
| 3,684,295 | 8/1972 | Strain | 360/105 |
| 3,724,858 | 4/1973 | Martin | 274/4 E |
| 3,747,941 | 7/1973 | Van der Lely | 274/4 E |
| 3,768,814 | 10/1973 | Sato | 360/105 |

FOREIGN PATENTS OR APPLICATIONS

| | | | |
|---|---|---|---|
| 32,265 | 5/1967 | Japan | 274/4 E |

*Primary Examiner*—Stanley M. Urynowicz, Jr.
*Assistant Examiner*—Robert S. Tupper
*Attorney, Agent, or Firm*—Fred Jacob

[57] ABSTRACT

This disclosure relates to a read/write device for use in conjunction with magnetic tape cassettes and is characterized in that protective interlocks are provided so that the read/write mechanism cannot be operated until the cassette is in its fully operative position within the recorder and that before release of the cassette from the recorder can be initiated, the magnetic head and pressure rollers which normally engage the tape are released therefrom. The invention particularly relates to a recorder of the type wherein there is a pivotally mounted cover having a recess in which the cassette is positioned and wherein loading and removal of the cassette relative to the recorder is effective by pivoting the cover with respect to the body of the recorder.

4 Claims, 6 Drawing Figures

PROTECTIVE INTERLOCK CONTROLLING MOVEMENT OF HEAD AND PINCH ROLLER INTO OPERATIVE POSITION

The present invention relates to a device for reading from and writing on magnetic tapes contained in "cassettes" commercially known as "cassette recorders."

Particularly the invention is related to the professional cassette recorders that are used in the data processing systems to store the information in binary form.

As it is known the characteristics required from these professional devices demand the fullfilment of special requirements of reliability, safety and reproducibility of operation, and durability. In addition it is required that the magnetic support be handled by the device in a manner avoiding physical damages to the same and alterations of the information contained therein.

Therefore a certain number of electrical and mechanical protections are provided. For example the reading and writing operations must be executed only when the magnetic tape cassette is placed in the device and at the same time the accidental or intentional removal of the cassette from the device must be prevented when reading and writing operations are under way.

The device of the invention is provided with a protection device of the aforementioned type and is also characterized by the fact that the protection device is associated with a mechanism for loading and removing the cassette so that even during the phases of loading and removing the cassette no read/write operations can be accomplished.

The load/remove mechanism is also designed in such a way to insure a precise positioning of the read/write head and a steady and precisely adjusted pressure of a pressure roller on the tape transport pivot. In this way the required contact pressure on the tape in correspondence of the writing head and the transport pivot is assured, thus putting the magnetic tape under controlled stress conditions.

A further characteristic of the device is that the positioning of the head and of the pressure roller is obtained by an electromagnetic control associated with a blocking device which maintains in work position the head and the pressure roller when the electromagnet is de-energized. In this way it is possible to greatly reduce the energy consumed by the electromagnet operation, the operation of which takes place for very short intervals for positioning the head.

A further characteristic of the device is the symmetrical structure of some component sub-units so that the device itself is suitable for uni-directional cassette recorders, that is able to read/write in one direction only, and also for bi-directional recorders that is to say able to read and write in two opposite directions, through the duplication of some sub-units being part of the device such as the motor driving the transport pivot and the electromagnetic head-positioning control sub-unit, the remaining parts of the device requiring no structural changes.

These and other characteristics and advantages of the invention will appear more clearly from the following description of a preferred embodiment and from the attached drawings in which.

Figure 1:
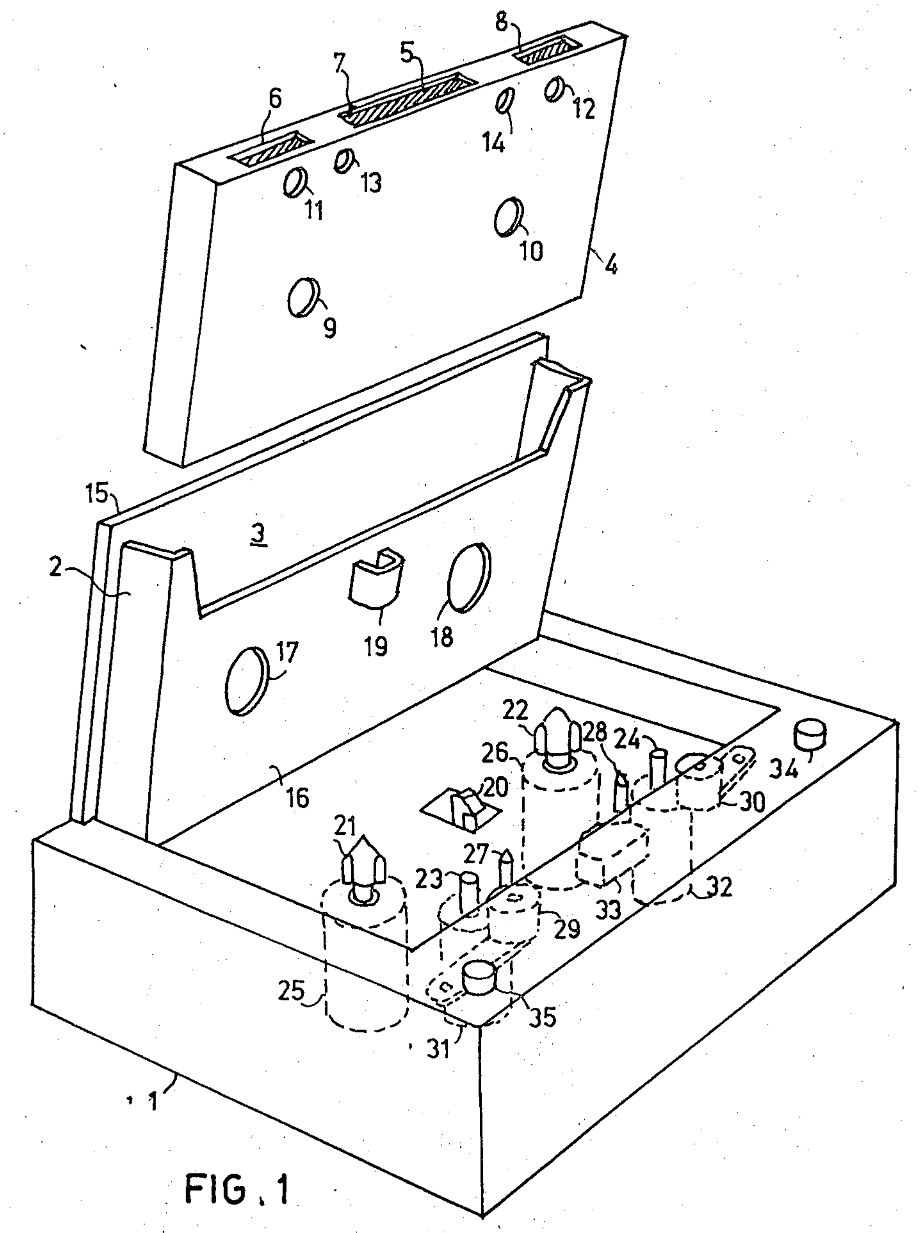
FIG. 1 is a perspective view of the general external aspect of the tape recorder.

The device includes a main body 1 in which the mechanical and electromechanical parts are housed, and a cover 2.

In the cover 2 there is a pocket 3 for housing a cartridge or magnetic tape cassette 4.

The cassette 4 contains two reels, not shown, on which the magnetic tape winds up and unwinds with the path of the tape being guided in such a way, that the tape 5 is accessible from the outside through three openings 6, 7, 8 of the cassette.

Under the tape, in alignment with the opening 7 there is a felt pad, not shown, assembled on a flat spring, not shown.

On the sides of the cassettes there are some round openings 9, 10, 11, 12 and 13, 14.

The openings 9, 10 are provided for receiving toothed shafts 21 and 22 which engage the reels contained in the cassette and apply a wind-up driving torque.

The openings 11 and 12 are provided for receiving drive shafts 23, 24 cooperating with suitable pressure rollers for driving directly the magnetic tape at a strictly controlled speed.

The openings 13 and 14 are instead provided for receiving reference pins 27, 28 insuring the correct positioning of the tape cartridge in the device.

The cover 2 is formed primarily of an external plate 15 hinged to the main body 1 of the device and of an internal plate 16 disposed parallel to the external plate.

The internal plate covers only partially the cartridge so to allow the drive shafts and the reference pins to enter the openings provided for this purpose in the cartridge, and it is provided with openings 17, 18 to allow the passage of the toothed shafts for moving the reels of the cartridge.

The cover is also provided usually with not shown means for the partial expulsion of the cartridge from the pocket and with devices for blocking in the closed position of the cover.

Such devices consist for example, of the bracket 19 jutting out from the internal plate 16 for receiving a tooth 20 of a blocking lever contained in the device.

FIG. 1 shows also the toothed shafts 21 and 22 driven by two motors 25 and 26 indicated with dashed lines, the drive shafts 23 and 24 driven by two motors 31, 32 indicated with dashed lines, and the reference pins 27, 28.

Pressure rollers 29 and 30, which cooperate with the drive shafts 23 and 24 and the read/write magnetic head 33 are indicated by dashed line.

In a first embodiment only one drive shaft and one pressure roller may be provided. However if the read/write operation in both directions is required, the pair of drive shafts and pressure rollers as shown in FIG. 1, driven selectively according to the chosen read/write direction, are conveniently used.

Once the cover of the recorder is closed, the read/-write operations may be enabled or performed under control of a push-button 34 which manually or through energization of an electromagnet, provides the engagement of the magnetic head 33 with the tape and the pressure roller (or one of the rollers) to a position co-operating with the corresponding drive shaft.

The opening of the recorder may be obtained by a release push-button 35.

Figure 2:
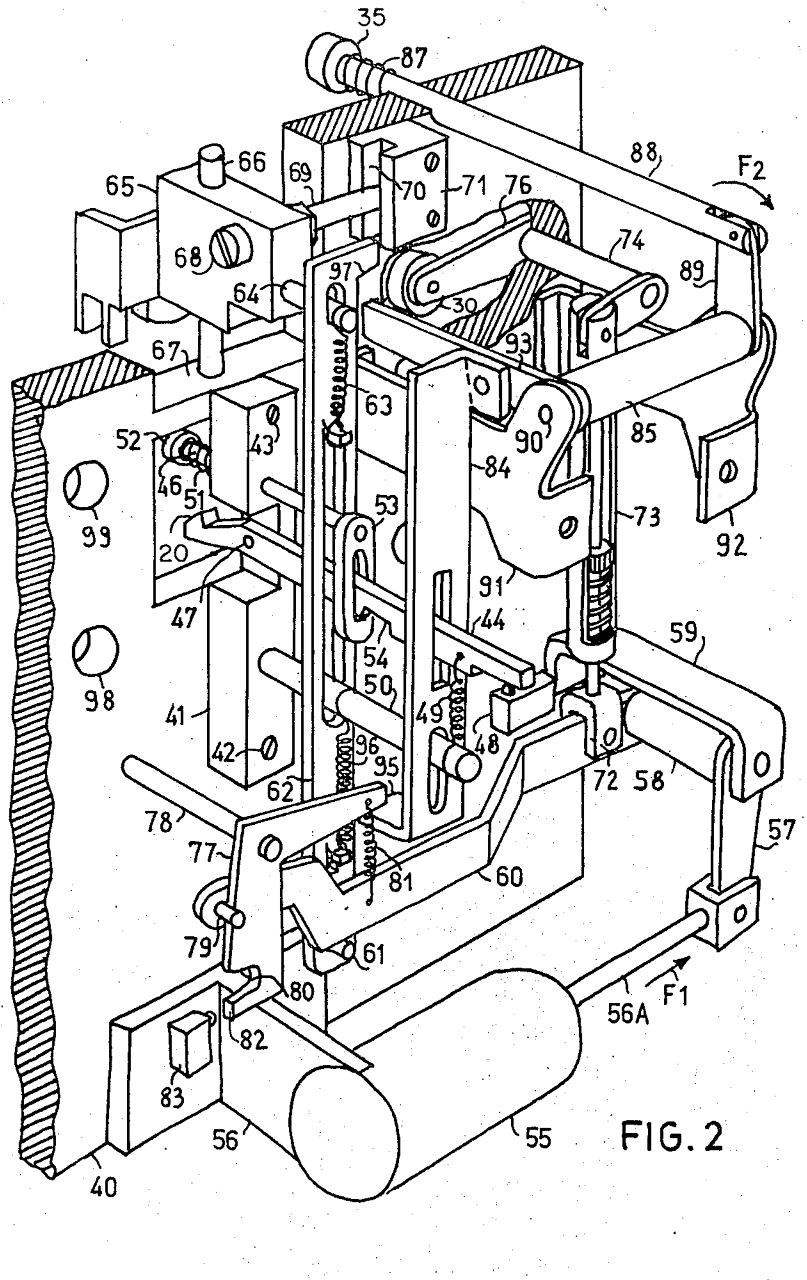
FIG. 2 is a rotated perspective view of the devices for the loading and removing the tape cassette and also of the devices for positioning the writing head and the pressure roller, according to the invention.

This very general and brief explanation is intended to clarify the characteristics and the functions of the devices which are the actual object of the invention and are best shown in FIG. 2.

The recorder body includes a base plate 40 (whose upper face is also partially visible in FIG. 1) on which the different mechanical and electrical parts of the device are secured either directly or by means of brackets, plates and pillars.

Let us consider first of all the loading and cover hooking mechanism and the protection device for preventing the read/write operations when the cover is opened, the cartridge is absent or the cartridge is being loaded or removed.

The hooking mechanism includes essentially a support plate 41 rigidly fixed to the base plate for example through screws 42, 43, a hooking lever 44 with end tooth 20 and a probing finger 46.

The hooking lever 44 is hinged on a pin 47, fixed on the plate 41 parallel to and near the base plate so the lever thelever is practically perpendicular to the base plate.

The toothed end of the lever extends into an opening of the base plate and arranged to receive also the hooking bracket 19, already mentioned and assembled on the cover.

At its opposite end the lever 44 acts on a microswitch 48. A spring 49 fixed to lever 44 and to a pillar 50 fixed with respect to the plate 41 tends to push the end of the lever 44 against the push button of the microswitch 48. However the action of the lever on the microswitch is conditioned by the probing finger 46.

The probing finger is mounted on the plate 41 and may slide axially therethrough. One end of the finger projects through an opening of the base plate into a compartment for housing the tape cassette and the related pocket 3.

A compression spring 51 which acts against the head 52 of the finger and the support 41 tends to maintain the finger in an advanced position in the place provided for the cassette.

At the opposite end of the finger there is a eyelet 53 in which the lever 44 may oscillate.

In the condition represented in the figure, in which the finger is in the forward position, the lever 44 bears against the internal lower surface of the eyelet and therefore the lever 44 cannot act on microswitch 48.

However, as FIG. 2 shows, the lever 44 has a recess 54 near the position occupied by the eyelet.

In response to the closing of cover 2, when the cover 2, containing a cartridge in pocket 3, is closed, the probing finger, acting on the face of the cartridge (and not on the plate 16) is pushed in a backward position; the eyelet 53 is brought in correspondence of the recess 54 and the lever 44 may therefore go down until it operates the microswitch 48.

It must be remarked that the microswitch is operated only when the loading operation is really completed.

In fact during the closing phase when the finger starts to slide and therefore the eyelet 53 starts to move the lever 44 cannot act on the microswitch because the hooking bracket 19 pushes against the side of the tooth 45 overcoming the action of the spring 49, moving away the end of the lever 44 from the microswitch.

Only when the bracket is hooked, that is when the tooth 45 suddenly engages the bracket, does the lever 44 again approach the microswitch and causes its operation.

At that moment there is no doubt that the loading operation has been carried out.

Similarly as explained later on the microswitch 48 is opened before the bracket 19 is released from the tooth 45 and before the other mechanical operations are accomplished.

In this way the microswitch 48 supplies an indication that guarantees the feasibility of the read/write operations for the whole period of time required.

Once the loading of the cartridge is over, before proceeding with the read/write operations it is necessary to position the magnetic head and the pressure roller.

Let us therefore examine the positioning device also shown in FIG. 2.

The electromagnet 55 is energized for a given time interval in response to an electric signal conditioned by the operation of the microswitch 48 and obtained through the manual pushing of a control push-button, which acts on a microswitch or also automatically from a control electric network operated for example by a computer.

The electromagnet is fixed to the base 40 for example through a bracket 56. The energizing of the electromagnet shifts the rod 56A in the direction indicated by the arrow F1.

The rod 56A acts on the arm 57 of a bell-crank lever 58 hinged on bracket 59 secured to base plate 40.

The second arm 60 of the bell-crank lever acts on the pin 61 fixed on the driving bar 62 and tends to move it downwards.

In turn the bar 62 acts by means of a spring 63 on pin 64 fixed rigidly to the support 65 of a magnetic head.

The support 65 may slide axially along the pin 66 secured to the base plate 40, so the action of spring 63 brings it in contact with the reference surface 67 of the base plate.

When the support 65 is in contact with the reference surface, the magnetic head is in the exact vertical position in respect to the magnetic tape. The alignment of the air gap of the head normally to the magnetic surface is obtained through the adjustment screw 68.

The adjustment screw 68 crosses the support 65 normal to the pin 66 and eccentrically with respect the same.

It is provided with an eccentric adjustment pin 69 which is engaged in a groove 70 disposed parallel to the pin 66 on the plate 71 which is secured to the base-plate.

By turning the screw 68, due to the eccentricity of the pin 69, it is possible to obtain small rotations of the support around the pin 66 and to reach therefore the exact adjustment of the air gap.

Besides the function of bringing the magnetic head in reading position the bell-crank lever 58 has also the function of positioning the pressure roller against the respective drive shaft.

The arm 60 of bell-crank 58 acts through the fork 72 on the adjustable tension rod 73 whose end acts on the bell-crank lever 74.

The pressure roller 30 fixed at the end of the arm 76 is therefore pressed against the drive shaft 24.

The pivot of the lever 74 is inserted in a bushing not indicated which goes through the baseplate 40.

The pressure exerted by roller 30 may be adjusted through the adjustment of the tension rod 73 which will be described further on.

As the electromagnet 55 is energized only for positioning but not for maintaining in position the head and the pressure roller, a retaining device is provided.

The retaining device is in the form of a pawl 77 hinged on pillar 78.

The end of the arm of the lever 60 has a pin 79 which upon the rotation of the arm 60 enters the groove 80 of the pawl 77.

The operation of the pawl 77 is assured by the spring 81 which tends to make the pawl rotate clockwise as seen in FIG. 2.

The electromagnet 55 may therefore be de-energized while the positioning device is maintained in operating conditions by the pawl.

The pawl itself (or any other suitable component of the device) may have a finger 82 which acts on a microswitch 83, when the connection has occurred, signaling that also the magnetic head and the pressure roller are ready to start the read or write operations.

The release or removal device is now to be considered.

The release device includes a release bar 84 driven by a bell-crank lever 85 and a release push-button 35.

The release push-button 35 normally is kept in a position of rest by the spring 87 and acts through the rod 88 on the arm 89 of the lever 85 causing its rotation in the sense indicated by the arrow F2.

The bell-crank 85 is hinged on a pin 90 maintained by two brackets 91 and 92 fixed to the base.

The release bar 84 is hinged on the arm 93 of lever 85 so that the rotation of the lever in the sense of the arrow F2 tends to lift it.

The release bar 84 presents a slit through which the end of the already seen hooking bar 44 may pass.

The lower part of the release bar guided for example by column 50 has a leg 95 which can engage the arm of the pawl 77.

In the first phase of the upwards motion the bar 84 starts to lift the lever 44.

This causes the immediate opening of the microswitch 48 and therefore the signalling that the operation to remove the cartridge has started.

No further read or write operation may therefore be accomplished.

In a second phase of the motion the bar 84 completes, by means of the leg 95 which turns the pawl 77, the release of the pin 79 from the pawl.

Then the lever 58, the driving bar 62, the magnetic head, the pressure roller are brought back to the rest position by the spring 96, fixed to the pillar 50 and to the driving bar 62. For further safety the bar 62 has a tooth 97 which is engaged by the end of the arm 93 of the release lever and avoids therefore possible bounces of the magnetic head.

It is only in a third phase that the bar 84 continuing in its upward motion completes the lifting of the lever 44 and allows effectively the release of the bracket 19 from the tooth 20 causing the opening of the cover and the removal of the cartridge by not indicated springs.

FIG. 2 shows, for clearness sake, only the essential elements forming the devices of hooking/release or insertion and removal of the cartridge. It is clear through that the device is completed by driving motors fixed directly or through brackets to the base.

In FIG. 2 it is possible to see for example the openings 98 and 99 arranged for receiving the shafts of two motors (one for the shaft 21 and one for the drive shaft 23) while similar and symmetric openings can be partially seen behind the release bar.

FIG. 2 refers to a unidirectional cassette recorder having therefore only one pressure roller and only one transport pivot.

However it is evident from FIG. 2 that it is possible to have also a second electromagnet like electromagnet 55, a second bell-crank lever like the lever 58, a second pawl like pawl 77, a second adjustable tension rod like the rod 73 and a second bell-crank lever like the lever 74 with associated pressure roller.

Thus the same device may be arranged for the use of two drive shafts and therefore offer a bidirectional read/write facility.

Figure 3:
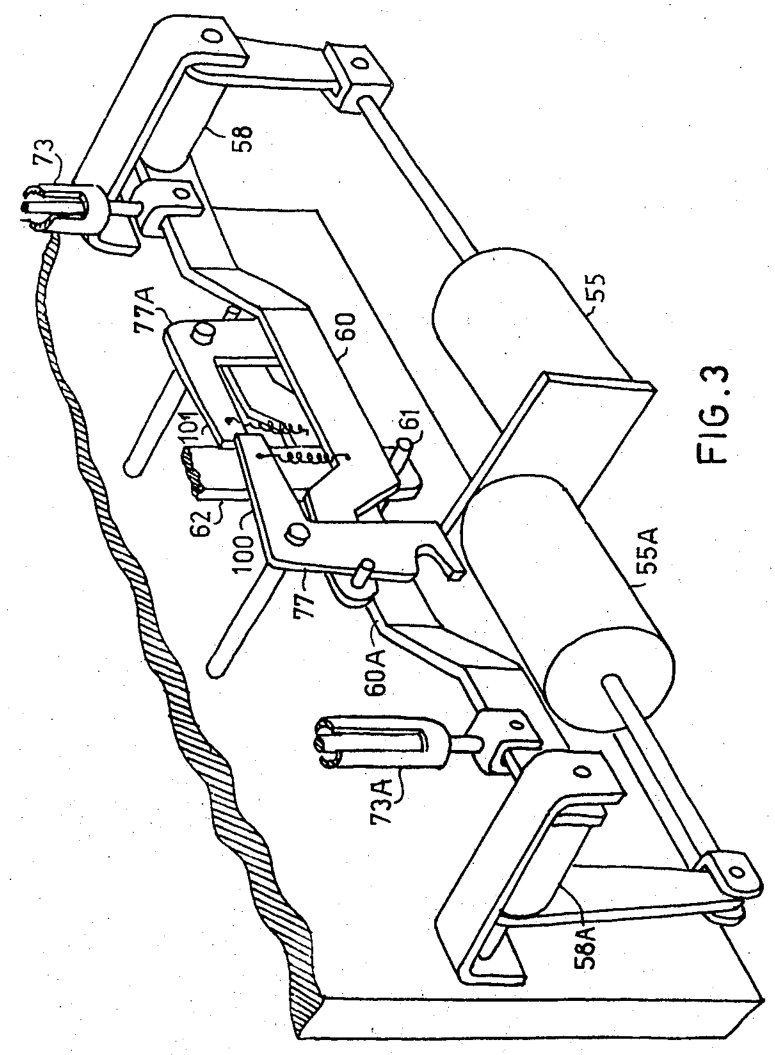
FIG. 3 is a perspective view showing how the duplication of some sub-units allows to obtain a bi-directional recorder.

In FIG. 3 there is shown the lower portion of a bidirectional cassette recorder and points out how the components already indicated may be duplicated and a possible arrangement of their assembly.

It may be seen in FIG. 3 the assembly of two electromagnets 55 and 55A, two bell-crank levers 58 and 58A, two pawls 77 and 77A, two adjustable tension rods 73 and 73A which act on two symmetric levers not indicated. The remaining part of the device, except for the provision for two transport pivots with related motors and detection means for the rotation speed and possible control devices is exactly equal to the one described previously and therefore it is not represented.

In FIG. 3 it is possible to see only the lower part of the driving bar 62 having pin 61.

The pin 61 juts out from both sides of the bar, so both the arm 60 and the arm 60A may act on the bar 62 moving it downwards.

In the same manner it is clear that the release bar, through its end leg acts on the arms 100 and 101 of both the pawls causing the release of the one which maintains in operating position one of the two arms 60, 60A.

Figure 4:
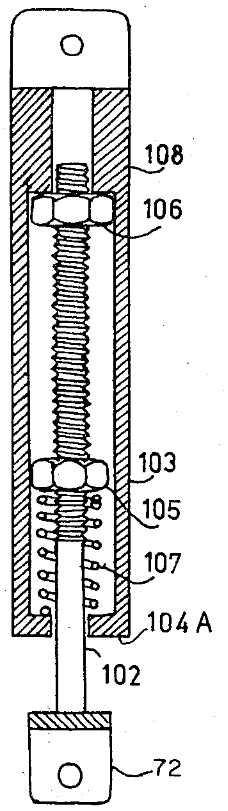
FIG. 4 is a vertical sectional view of a component of the device according to the invention.

FIG. 4 shows in section a possible arrangement of the adjustable tension rod 73 (and 73A).

The tension rod consists of a central threaded rod 102 and a cylindrical hollow member 103.

At one end of the rod there is the fork 72 for connection with the arm 60.

A similar fork is provided at the upper end of the bracket body 103.

The lower end 104A of the hollow member 103 has a hole through which the rod 102 may glide.

Two nuts 105 and 106 are screwed on the rod.

A compression spring 107 is mounted on the rod and maintained in compression between the lower end 104A and the nut 105 against which it bears.

The pressure of the spring tends to push the rod inside the hollow member 103.

Such an action is opposed by the nut 105 which bears against the upper end 108 of the hollow member 103.

The upper part of the rod is freely housed in an opening of the upper part 108.

It is evident that by adjusting the position of the nut 106 it is possible to adjust the length of the tension rod while by adjusting the position of the nut 105 with respect to the position of the nut 106, it is possible to change the force exerted by the spring and therefore the threshold tension above which the tension rod no longer behaves as a rigid elements, but is stretched by compressing the spring.

By the use of such member together with a lever carrying the pressure roller it is therefore possible to adjust both the clearance between the pressure and the transport pivot (by adjusting the nut 106) when the device is in rest position and the pressure of the roller on the transport pivot when the device is operating (by adjusting the nut 105).

It is evident that the aforesaid description refers to a preferred embodiment of the device and its protecting contrivances and that several changes may be carried out by anyone skilled in the art without departing from the spirit and scope of the invention.

Figure 5A:
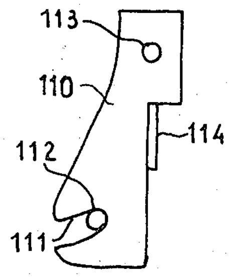
FIGS. 5A and 5B show respectively in front and side view a variant of a second component of the device according to the invention.
Figure 5B:
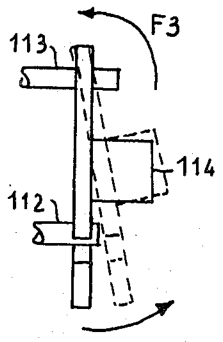

FIGS. 5A and 5B illustrate another embodiment of the pawl which may be particularly convenient to reduce the manual effort required for the release.

The 110 is freely hinged to a pin 113 and presents a tongue 114 bent at a right angle.

Such a tongue is clearly shown in FIG. 5B.

The release of the pin 112 from the pawl is obtained in this case by acting on the tongue 114 so to impress to the pawl a small rotation around an axis perpendicular to the pin 113 in the direction indicated by the arrow F3. The pawl reaches therefore the position indicated by dashed lines and it is released from the pin 112 by the axial shifting of the recess 111 in the direction of the pin.

We claim:

1. In a tape cassette recorder having a main frame, a magnetic head, means slidably mounting said magnetic head on said frame for movement between an operating position and a retracted position, a pressure roller lever means pivotally mounting said pressure roller on said frame for movement between an operating position and a retracted position, a cover having a pocket for said tape cassette, means pivotally mounting said cover on said frame, for movement between an open and closed position, a device for loading and removing the tape cassette, including: a first spring means for biasing said magnetic head to said operating position, a bar, means slidably mounting said bar on said frame for movement between an operating position and a retracted position, a second spring means biasing said bar to said retracted position, means coupling said bar to said means slidably mounting said magnetic head to maintain said magnetic head in said retracted position when said bar is in its retracted position and to leave said magnetic head free to reach its operating position when said bar is in its operating position, a hooking lever, means pivotally mounting said hooking lever on said frame, spring means biasing said hooking lever to a hooking position cooperating with said cover to hook said cover in said closed position, a movable probing member carried by said frame and positioned to be contacted by a tape cassette contained in said cover pocket means mounting said probing member for movement to an operative position when contacted by a cassette, said probing member having means normally engaging said hooking lever and limiting pivoting thereof, and said probing member means when said probing member is in said operating position allowing a further pivoting of said hooking lever, a switch actuated by said hooking lever when further pivoting of said hooking lever is allowed by said probing member, an electromagnet, mounted on said frame and energized by actuation of said switch leverage means connected to said bar and said lever means for moving both into said operating position upon energization of said electromagnet, a pawl means mounted on said frame for maintaining said leverage means in said operated position even when the electromagnet is de-energized, and release means for disengaging first said pawl means and subsequently said hooking lever to release said cover and allow the opening of said cover.

2. The device for loading and removing a tape cassette, as claimed in claim 1, further comprising an adjustable tension rod connection between said pressure roller lever means and said leverage means, said adjustable tension rod comprising a first shaft, a second shaft slidably mounted in said first shaft, a compression spring for biasing said second shaft into said first shaft, first stop means for adjusting the tension of said compression spring, and second stop means for adjusting the inward position of said second shaft in respect to said first shaft.

3. The device for loading and removing a tape cassette, as claimed in claim 1, further comprising a cylindrical pin on said frame, said magnetic head being axially slidably mounted on said pin, a fixed guide member on said frame, and adjustable means on said head, cooperating with said guide member to set the angular position of said head on said cylindrical pin.

4. The device of claim 3 wherein said adjustable means consists of a screw mounted on said head and provided with an end projection eccentric to said screw and cooperating with said guide member.

* * * * *